US009894232B2

(12) United States Patent
Shiokawa

(10) Patent No.: US 9,894,232 B2
(45) Date of Patent: Feb. 13, 2018

(54) IMAGE READING APPARATUS

(71) Applicant: RISO KAGAKU CORPORATION, Tokyo (JP)

(72) Inventor: Mitsuharu Shiokawa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/357,062

(22) Filed: Nov. 21, 2016

(65) Prior Publication Data

US 2017/0155789 A1 Jun. 1, 2017

(30) Foreign Application Priority Data

Nov. 30, 2015 (JP) ................................ 2015-233057

(51) Int. Cl.

*H04N 1/04* (2006.01)
*H04N 1/028* (2006.01)
*H04N 1/00* (2006.01)

(52) U.S. Cl.

CPC ..... *H04N 1/02885* (2013.01); *H04N 1/00013* (2013.01); *H04N 1/00068* (2013.01); *H04N 1/00082* (2013.01); *H04N 2201/0081* (2013.01)

(58) Field of Classification Search

CPC ................ H04N 9/045; H04N 1/4005; H04N 2201/0094; H04N 5/2256; H04N 5/30; H04N 1/02815; H04N 1/1013; H04N 2201/0081; H04N 5/23216

USPC ............... 399/74, 51, 121, 405; 348/E5.029, 348/E5.031, E5.038, E5.045; 358/3.26, 358/475, 1.5, 1.9, 2.1, 302, 3.27, 406, 358/474, 482, 483, 504, 505, 514, 527; 382/132, 319

See application file for complete search history.

(56) References Cited

U.S. PATENT DOCUMENTS 5,032,903 A * 7/1991 Suzuki ............... H04N 1/00352 358/448
2003/0053093 A1* 3/2003 Eom ...................... H04N 1/506 358/1.9
2006/0023267 A1* 2/2006 Ikeno ................... H04N 1/1017 358/474

(Continued)

FOREIGN PATENT DOCUMENTS

JP 2001-245111 9/2001
JP 2013-073286 4/2013

OTHER PUBLICATIONS

Extended European Search Report in EP16200881.7, dated Apr. 26, 2017.

*Primary Examiner* — Negussie Worku

(74) *Attorney, Agent, or Firm* — Greenblum & Bernstein, P.L.C.

(57) ABSTRACT

An image reading apparatus includes a light emitting element, a luminance calculating unit, a light amount setting unit, and a storing unit. The light amount setting unit, in each line period, causes the light emitting element to emit a light with gradually changing a reference light amount from a reference light amount set as a default value from among a plurality of reference light amounts stored in the storing unit, identifies a reference light amount so that the luminance calculated by the luminance calculating unit is within a predetermined range, sets the identified reference light amount as a default value for the next line period, and causes the storing unit to store that reference light amount.

2 Claims, 4 Drawing Sheets

(56) References Cited

U.S. PATENT DOCUMENTS

| | | | | |
|---|---|---|---|---|
| 2007/0025748 | A1* | 2/2007 | Ishibashi | G03G 15/5033 399/49 |
| 2009/0135304 | A1* | 5/2009 | Inoue | G09G 3/3208 348/712 |
| 2009/0216229 | A1* | 8/2009 | Chojin | A61B 18/1445 606/52 |
| 2009/0296172 | A1 | 12/2009 | Iwatsuka | |
| 2010/0231991 | A1 | 9/2010 | Nakajima | |
| 2012/0201552 | A1* | 8/2012 | Hirai | G03G 15/5058 399/49 |
| 2012/0320435 | A1* | 12/2012 | Horiuchi | G03G 15/043 358/475 |
| 2013/0003147 | A1* | 1/2013 | Shimatani | G03G 15/602 358/505 |
| 2013/0120772 | A1* | 5/2013 | Yamaguchi | G03G 15/755 358/1.9 |
| 2013/0141734 | A1* | 6/2013 | Aoki | G01B 11/2527 356/601 |
| 2014/0118687 | A1* | 5/2014 | Ohban | A61B 3/14 351/206 |
| 2015/0276384 | A1* | 10/2015 | Saiki | G03G 15/55 356/620 |
| 2016/0295070 | A1* | 10/2016 | Nakazawa | H04N 1/40056 |
| 2017/0034364 | A1* | 2/2017 | Matsumi | H04N 1/00087 |
| 2017/0248889 | A1* | 8/2017 | Uematsu | G03G 15/5062 |

* cited by examiner

IMAGE READING APPARATUS

CROSS REFERENCE TO RELATED APPLICATION

This application claims benefit of priority under 35 U.S.C. § 119 to Japanese Patent Application No. 2015-233057, filed on Nov. 30, 2015, the entire contents of which are incorporated by reference herein.

BACKGROUND OF THE INVENTION

1. Field of the Invention

The present invention relates to an image reading apparatus that quickly determines an appropriate light amount for each line period.

2. Description of the Related Art

Image reading apparatuses include a light emitting element that emits a light, a light receiving element that receives the reflected light, and a reference density board. For example, when a power supply of an image reading apparatus is switched on, the light emitting element emits a light on the reference density board, and the light receiving element receives the light reflected by the reference density board. The image reading apparatus adjusts, based on the received light amount, the light amount emitted by the light emitting element.

Because a line period differs for each image reading setting when the image reading apparatus requires many image reading settings (resolution and the like) to be made, it is necessary to set the light emitting element so that a light amount that is appropriate for each line period is emitted. The line period refers to a reading interval set for reading an original document line by line. When the line period is long, an image can be appropriately read even with a small light amount. On the other hand, when the line period is short, it is necessary to increase the light amount to appropriately read an image.

Therefore, to appropriately read an image, for example, when the power supply is switched on, an appropriate light amount must be set for each image reading setting, in other words, for each line period.

Patent Document 1 (Japanese Patent Application Laid-open No. 2013-73286) discloses a paper sheet recognition apparatus that detects a transporting speed of a banknote BL to be read, and according to the transporting speed of the banknote BL, corrects the light amount emitted by a light emitting element.

However, in the above-described paper sheet recognition apparatus, when correcting the light amount emitted by the light emitting element according to the transporting speed of the banknote BL, it is necessary to determine an extent to which the light amount emitted by the light emitting element is to be corrected.

For example, one approach is to, for each line period, emit a light from the light emitting element at a given light emitting amount, receive the reflected light with the light receiving element, calculate a luminance based on the received light amount, and determine the light emitting amount of the light emitting element so that the calculated luminance is within a predetermined range.

In the above-described method, if the calculated luminance is not within the predetermined range when a light is emitted by the light emitting element at a given light emitting amount in a given line period, the light emitting amount is changed to determine an appropriate light emitting amount so that the luminance is within the predetermined range.

In this manner, because the operation of determining an appropriate light emitting amount for each line period so that the luminance is within the predetermined range is performed by repeatedly performing (1) changing of the light emitting amount, (2) measurement of the received light amount, and (3) calculation of luminance, a considerable time is taken to determine an appropriate light amount for all the line periods.

SUMMARY OF THE INVENTION

The present invention has been made in view of such circumstances, and it is an object of the present invention to provide an image reading apparatus that quickly determines an appropriate light amount for each line period.

In order to achieve the above-described object, according to one aspect of the present invention, there is provided an image reading apparatus including a light emitting element that emits a light; a light receiving element that receives the light reflected by a reference board upon being emitted from the light emitting element; a line period setter that sequentially sets a line period from among a plurality of line periods having mutually different intervals of a light receiving start signal sent from the light receiving element; a luminance calculator that calculates a luminance based on a light amount received by the light receiving, element in the line period set by the line period setter; a storage that stores therein a plurality of reference light amounts each of which is a reference light amount of the light emitted by the light emitting element; and a light amount setter that, in each line period, causes the light emitting element to emit the light with gradually changing the reference light amount from a reference light amount set as a default value among the plurality of reference light amounts stored in the storage, identifies a reference light amount so that the luminance calculated by the luminance calculator is within a predetermined range, sets the identified reference light amount as a default value for the next line period, and causes the storage to store that the identified reference light amount.

According to one aspect of the present invention, for each line period, the light amount setter causes the light emitting element to emit the light with gradually changing the reference light amount from the reference light amount that is set as the default value among the plurality of reference light amounts that stored in the storage, identifies a reference light amount so that the luminance calculated by the luminance calculator is within the predetermined range, sets the identified reference light amount as the default value in the next line period, and causes the storage to store the identified reference light amount. Therefore, upon setting the light amount of the light emitting element in a given line period, the luminance can be calculated by considering the set light amount as the reference light amount in the other line periods, and it can be determined whether the calculated luminance is within the predetermined range. Thus, compared to the conventional technology, a part of the process can be omitted, and the appropriate light amount in each line period can be determined quickly.

DESCRIPTION OF THE EMBODIMENTS

Exemplary embodiments of an image reading apparatus according to the present invention will be described below. The following embodiments cite an apparatus and the like that realize the technical concept of the present invention as an example. However, the technical concept of the present invention regarding the arrangement of various components is not limited to such embodiments. The technical concept of the present invention can be modified within the scope of claims.

(Structure of Image Reading Apparatus)

Figure 1:
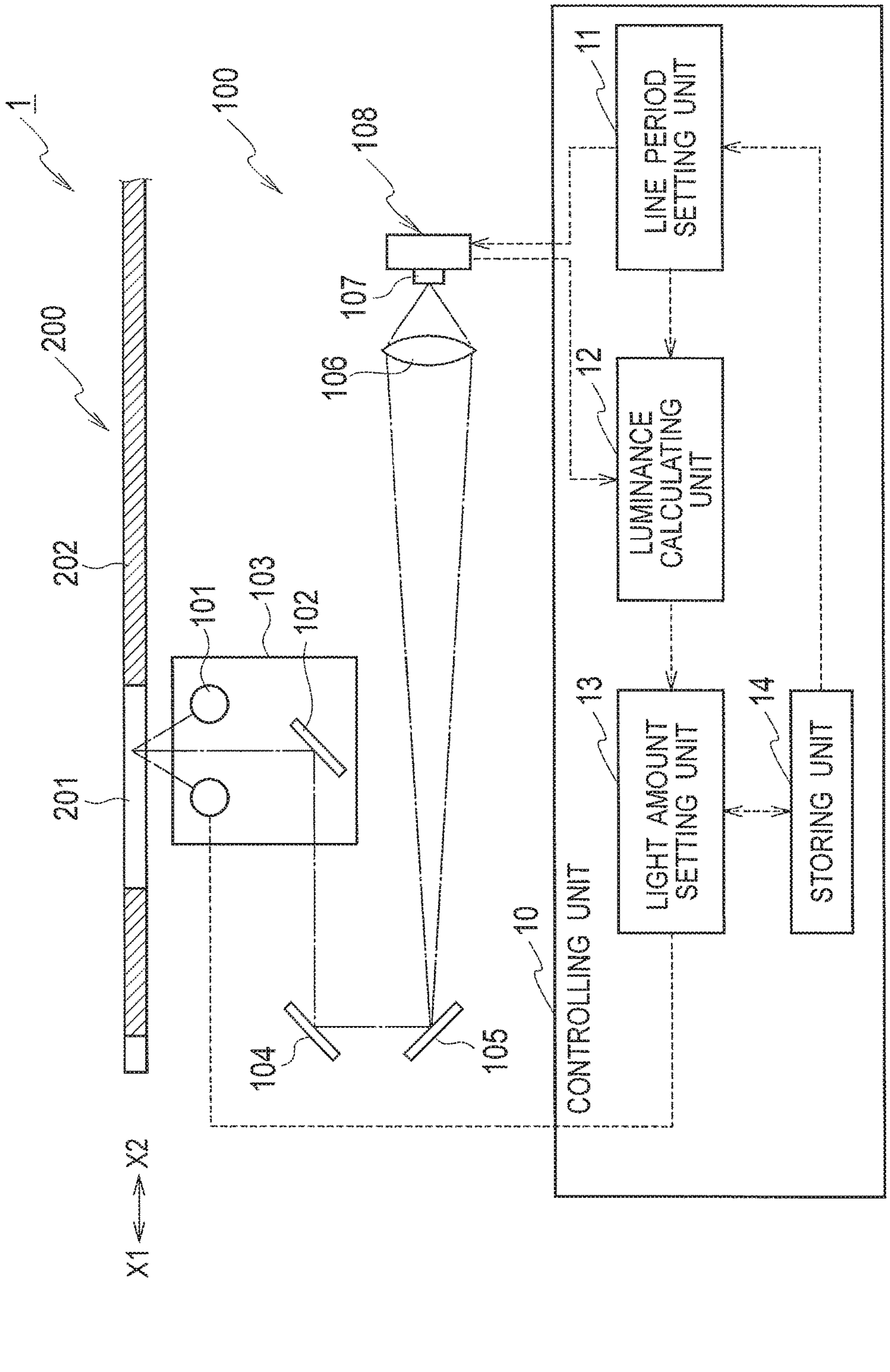
FIG. 1 is a structural diagram of an image reading apparatus according to an embodiment of the present invention.

FIG. 1 is a structural diagram of the image reading apparatus according to an embodiment of the present invention.

As shown in FIG. 1, an image reading apparatus 1 includes a platen 200, a reading unit 100, and a controlling unit 10.

A white reference density board 201 to be used for adjusting the light amount, and a colorless transparent document reading glass 202 to be used for reading an original document are arranged on the platen 200.

The reading unit 100 is arranged below the platen 200.

The reading unit 100 includes a carriage 103 that is movably supported by a guide rail (not shown) in a sub scanning direction (X1-X2 direction) along the platen 200. The carriage 103 includes a plurality of light emitting elements 101 that emits light, and a plurality of reflective plates 102. When adjusting the light amount, the carriage 103 is positioned below the reference density board 201 so that the light emitted from the light emitting elements 101 is reflected from the reference density board 201. When reading an original document, the carriage 103 is positioned below the document reading glass 202 so that the light emitted from the light emitting elements 101 is reflected from the original document placed on the document reading glass 202, and reads the original document while moving line by line in the sub scanning direction.

Reflective plates 104 and 105 are arranged on an optical path of the light that is reflected by the corresponding reflective plate 102 upon being emitted from each of the light emitting elements 101. Each reflected light is reflected by the reflective plates 104 and 105, and enters a converging lens 106.

The reflected light converged by the converging lens 106 is received by a light receiving element 107 of a receiving unit 108.

A plurality of the light emitting elements 101 is arranged in a line in a main scanning direction (a direction orthogonal to the sub scanning direction, front—depth direction of FIG. 1). Similarly, a plurality of the light receiving elements 107 is arranged in a line in the main scanning direction. The light emitting elements 101 emit light simultaneously, and the light receiving elements 107 receive the light reflected by the reflective plates 102 upon being emitted from the light emitting elements 101. It is noted that the number of the light emitting elements 101 may be one.

The controlling unit 10 includes a line period setting unit 11, a luminance calculating unit 12, a light amount setting unit 13, and a storing unit 14.

The line period setting unit 11 sequentially sets a line period from among a plurality of line periods having mutually different intervals of a light receiving start signal.

The luminance calculating unit 12 calculates a luminance based on the reflected light amount received by each of the light receiving elements 107 in the line period set by the line period setting unit 11.

For each line period, the light amount setting unit 13 causes the light emitting elements 101 to simultaneously emit the light with gradually changing a reference light amount from a default value of the reference light amount stored in the storing unit 14, identifies a reference light amount so that the luminance calculated by the luminance calculating unit 12 is within a predetermined range, and causes the storing unit 14 to store the identified reference light amount as a default value of the reference light amount of light for the next line period.

The storing unit 14 stores therein a plurality of reference light amounts that is a reference for the light amount emitted from each of the light emitting elements 101.

(Operation of Image Reading Apparatus)

Figure 2:
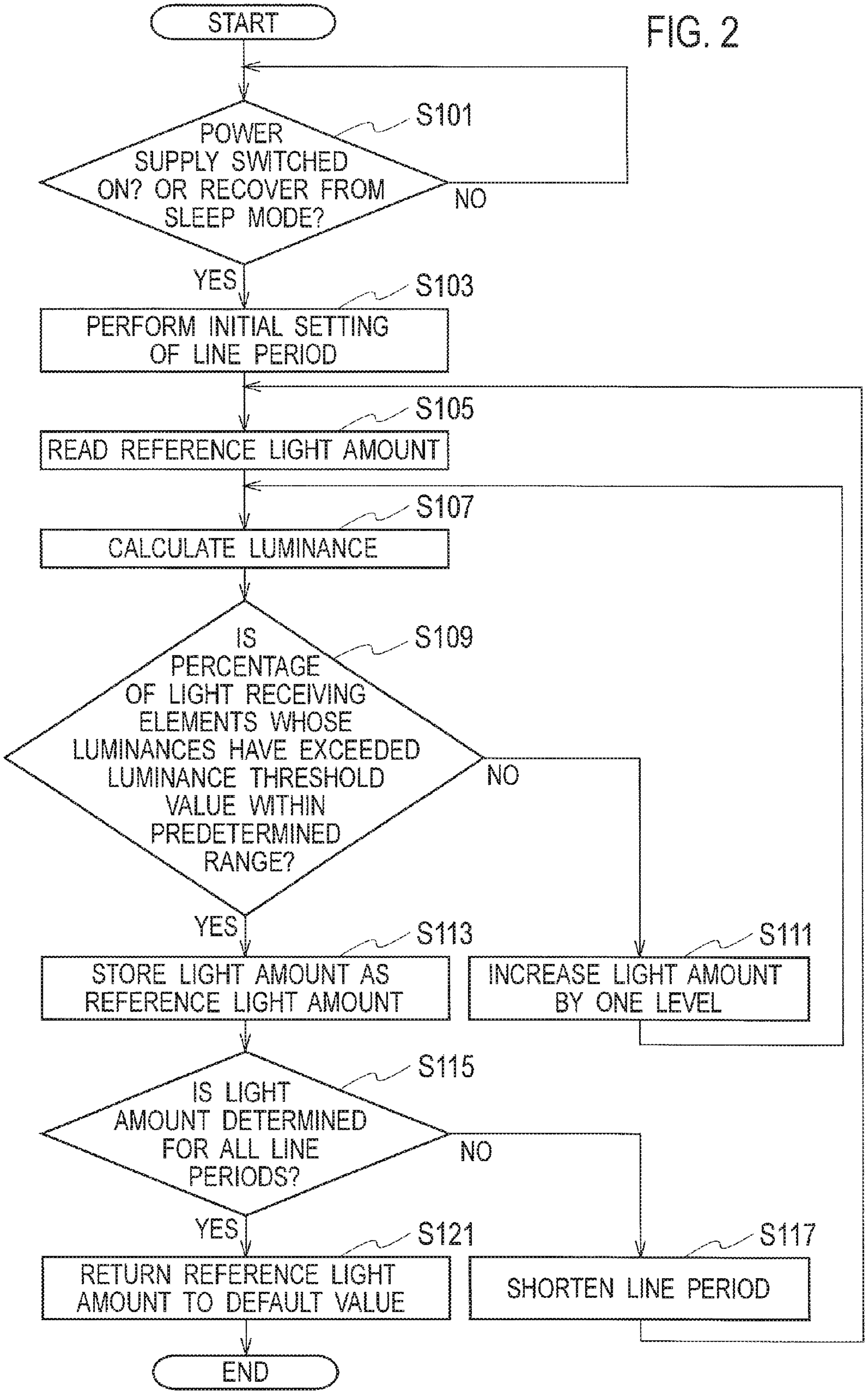
FIG. 2 is flowchart showing process procedures performed by the image reading apparatus according to the embodiment of the present invention.

FIG. 2 is a flowchart showing process procedures performed by the image reading apparatus 1.

As shown in FIG. 2, when a power supply of the image reading apparatus 1 is switched on, or is recovered from a sleep mode (Step S101: YES), as an initialization operation, it is necessary to adjust the light amount of each of the light emitting elements 101 so that the light amount is appropriate for each line period. As described above, the line period is defined in accordance with image reading settings such as resolution, and is a reading interval when reading an original document line by line.

The line period setting unit 11 in the controlling unit 10 performs an initial setting of a line period that is determined in advance among the plurality of the line periods (Step S103). The default value of the line period is stored in the storing unit 14. For example, a predefined longest line period of 400 (μs) is set as a default value among 400 (μs), 300 (μs), and 200 (μs) that can be set as the line period.

The light amount setting unit 13 reads the reference light amount from the storing unit 14 (Step S105). For example, 40(%), 50(%), 60(%), 70(%), and 80(%) can be set as a reference light amount, and when the lowest value 40(%) is stored as the default value, the light amount setting unit 13 reads the stored 40(%) as the reference light amount. As will be described later, when the reference right amount is updated, the light amount setting unit 13 reads the updated reference light amount.

The luminance calculating unit 12 calculates a luminance based on the reflected light amount received by each of the light receiving elements 107 in the line period set by the line period setting unit 11 (Step S107).

The light amount setting unit 13 determines whether the percentage of the light receiving elements having the luminance that has exceeded a luminance threshold value is within a predetermined range (Step S109).

Figure 3A:
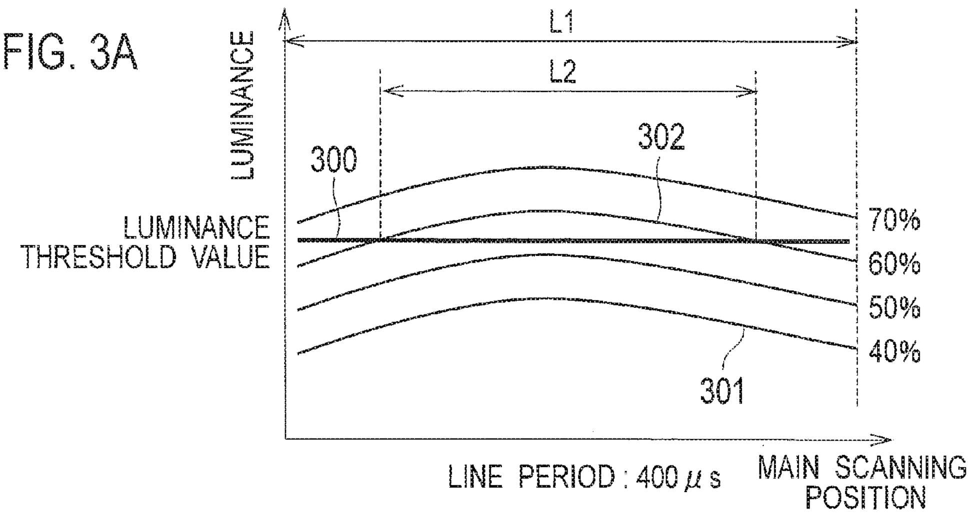
FIG. 3A is an illustrative view explaining a determining process of a luminance calculating unit of the image reading apparatus according to the embodiment of the present invention, and depicts a luminance that is calculated based on a light amount received by each of light received elements arranged in a line in a main scanning direction for a line period set at a default value, 400 (μs).
Figure 3B:
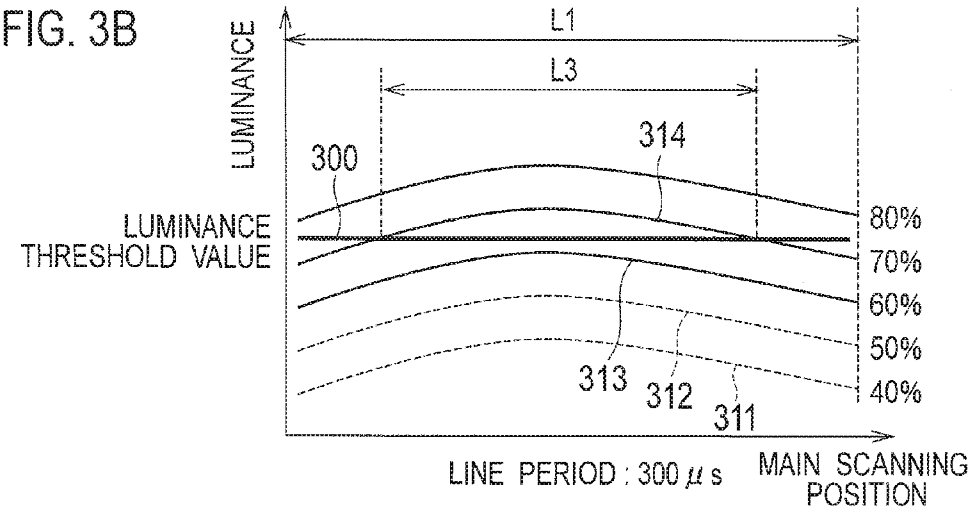
FIG. 3B is an illustrative view explaining the determining process of the luminance calculating unit of the image reading apparatus according to the embodiment of the present invention, and depicts a luminance that is calculated based on a light amount received by each of the light receiving elements arranged in a line in the main scanning direction for a line period of 300 (μs).
Figure 3C:
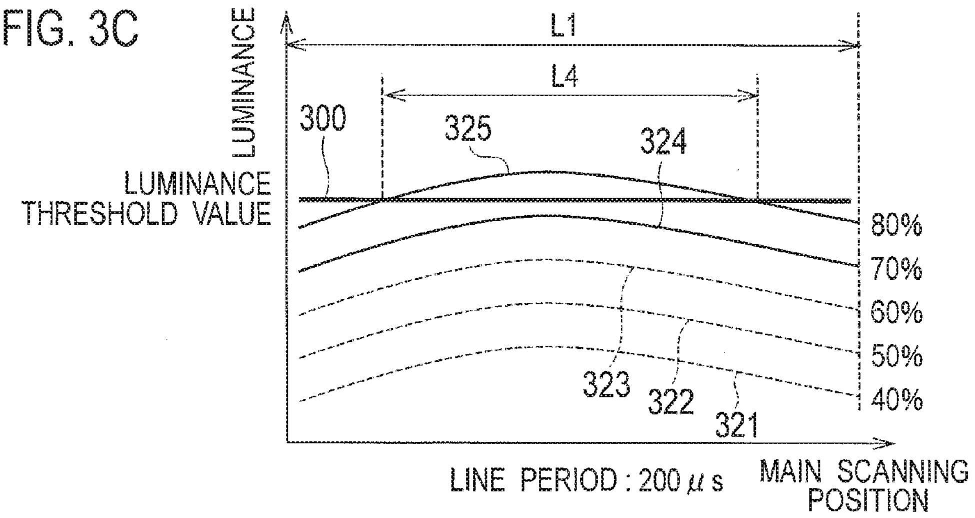
FIG. 3C is an illustrative explaining the determining process of the luminance calculating unit of the image reading apparatus according to the embodiment of the present invention, and depicts a luminance that is calculated based on a light amount received by each of the light receiving elements arranged in a line in the main scanning direction for a line period of 200 (μs).

FIGS. 3A to 3C are illustrative views explaining a determining process performed by the luminance calculating unit 12 in the image reading apparatus 1. In FIG. 3A, a luminance that is calculated based on the light amount received by each of the light receiving elements 107 arranged in a line in the main scanning, direction for the line period of 400 (μs), which is the default value, is shown.

In the present embodiment, because a value of 40(%) is stored as the default value of the reference light amount, as shown in FIG. 3A, the light amount setting unit 13 calculates the percentage of the light receiving elements having a luminance 301 that has exceeded a luminance threshold value 300 when the light amount (output) of each of the light emitting elements 101 is set to 40(%). Because the luminance 301 shown in FIG. 3A does not exceed the luminance threshold value 300, the percentage of the light receiving elements having the luminance that has exceeded the luminance threshold value is 0(%). As a result, the percentage is determined to be not within the predetermined range. The predetermined range is a range of the percentage of the light receiving elements when the sufficient luminance obtained for appropriately reading an image in one line in the main scanning direction. The predetermined range is set to in advance, for example, 50(%) to 70(%). In other words, if the percentage of the light receiving elements having the luminance that has exceeded the luminance threshold value is less than 50(%), the light amount for the entire one line in the main scanning direction is too small, causing the image formed by reading the original document to be a dark image. On the other hand, if the percentage of the light receiving elements having the luminance that has exceeded the luminance threshold value exceeds 70(%), the light amount for the entire one line in the main scanning direction may become excessive, causing the color of the image formed by reading the original document to be unclear. Therefore, it is necessary to set advance the range of the percentage of the light receiving elements having the luminance that exceeds the luminance threshold value so as to obtain the sufficient luminance for appropriately reading an image.

When it is determined that the percentage of the light receiving elements having the luminance that has exceeded the luminance threshold value is not within the predetermined range (Step S109: NO), it means that the read image is too dark when the light amount (output) of each of the light emitting elements 101 is set to 40(%), and thus the light amount setting unit 13 increases the light amount by one level (Step S111). In the example shown in FIG. 3A, 40(%) is increased to 50(%) in the increments of 10(%).

Next, the control is returned to Step S107, where each of the light emitting elements 101 is again caused to emit the light at the light amount increased by one level. The luminance calculating unit 12 then calculates the luminance based on the light amount of the reflected light received by each of the light receiving elements 107 (Step S107), and the light amount setting unit 13 determines whether the percentage of the light receiving elements having the luminance that has exceeded the luminance threshold value is within the predetermined range S109).

In the example shown in FIG. 3A, the read image is too dark even when the light amount (output) of each of the light emitting elements 101 is set to 50(%), and in a luminance 302 when the light amount (output) of each of the light emitting elements 101 is 60(%), the percentage of the number L2 of the light receiving elements 107 having the luminance that has exceeded the luminance threshold value 300 with respect to the total number L1 of the light receiving elements 107 arranged in the main scanning direction, is within the predetermined range (50(%) to 70(%)). In such a situation, when the light amount (output) of each of the light emitting elements 101 is 60(%), the light amount setting unit 13 determines that the percentage of the light receiving elements having the luminance that has exceeded the luminance threshold value is within the predetermined range (Step S109: YES).

Upon determining that the percentage of the light receiving elements having the luminance that has exceeded the luminance threshold value is within the predetermined range (Step S109: YES), the light amount setting unit 13 updates the reference light amount stored in the storing unit 14 with the set light amount as a new reference light amount (Step S113). In the example shown in FIG. 3A, the light amount (output) of 60(%) of each of the light emitting elements 101 is stored as reference light amount.

Next, the light amount setting unit 13 determines whether the light amount is determined for all the line periods among the line periods 400 (μs), 300 (μs), and 200 (μs) that can be set (Step S115).

When it is determined that the light amount is not determined for all the line periods (Step S115: NO), the light amount setting unit 13 shortens the line period (Step S117). For example, if the presently set line period is 400 (μs), then 300 (μs) is set as the line period, and if the presently set is 300 (μs), then 200 (μs) is set as the line period.

Then, the control is returned to Step S105 where the light amount setting unit 13 reads the reference light amount from the storing unit 14 (Step S105), and then the processes at Steps S107, S109, S111, S113, S115, and S117 are performed. However, because the reference light amount was updated at Step S113, after the shortening of the line period at Step S117, a light amount in which the percentage of the light receiving elements having the luminance that has exceeded the luminance threshold value is within the predetermined range can be determined by considering the light amount set for the previous line period as the reference light amount. Therefore, the light amount can be determined in a short time.

In FIG. 3B, a luminance that is calculated based on the light amount received by each of the light receiving elements 107 that arranged in a line in the main scanning direction for the line period of 300 (μs) is shown.

In this example, because a value of 60(%) is stored as the default value of the reference light amount, as shown in FIG. 3B, the light amount setting unit 13 calculates a luminance 313 when the light amount (output) of each of the light emitting elements 101 is set to 60(%), instead of calculating a luminance 311 when the light amount (output) of each of the light emitting elements 101 is set to 40(%) and a luminance 312 when the light amount (output) of each of the light emitting elements 101 is set to 50(%). Then, the light amount setting unit 13 calculates the percentage of the light receiving elements having the luminance 313 that has exceeded the luminance threshold value 300. Because the luminance 313 shown in FIG. 3B does not exceed the luminance threshold value 300, the percentage of the light receiving elements having the luminance that has exceeded the luminance threshold value is 0(%). As a result, the percentage is determined to be not within the predetermined range.

The light amount setting unit 13 then calculates a luminance 314 when the light amount (output) of each of the light emitting elements 101 is set to 70(%). Because the percentage of the number L3 of the light receiving elements 107 having the luminance 314 that has exceeded the luminance threshold value 300 with respect to the total number L1 of the light receiving elements 107 arranged in the main scanning direction, is within the predetermined range (50 (%) to 70(%)), the light amount setting unit 13 determines that the percentage of the light receiving elements having the luminance that has exceeded the luminance threshold value is within the predetermined range. Accordingly, the light amount setting unit 13 stores the light amount (output) of 70(%) of each of the light emitting elements 101 as the reference light amount in the storing unit 14.

In this manner, by reading the reference light amount from the storing unit 14 and changing the read reference light amount, the light amount setting unit 13 sets the light amount of each of the light emitting elements 101 so that the luminance calculated by the luminance calculating unit 12 is within the predetermined range. Therefore, because an appropriate light amount of each of the light emitting elements 101 can be set by setting the light amount in the previous line period as the reference light amount after the line period is changed, the light amount can be determined in a short time. In the example shown in FIG. 3B where the line period is set to 300 (μs), because the light amount setting unit 13 does not calculate the luminance 311 when the light amount (output) of each of the light emitting elements 101 is set to 40(%) and the luminance 312 when the light amount (output) of each of the light emitting elements 101 is set to 50(%), the light amount can be determined quickly.

Furthermore, upon determining the light amount in the line period of 300 (μs) and then setting the line period to 200 (μs) by executing the processes of Steps S115 and S117, amount setting unit 13 reads the reference light amount from the storing unit 14 (Step S105), and then executes the processes of Steps S107, S109, S111, S113, S115, and S117.

In FIG. 3C, a luminance that is calculated based on the light amount received by the light receiving elements 107 arranged in a line in the main scanning direction for the line period of 200 (μs) is shown.

In this example, because a value of 70(%) is stored as the default value of the reference light amount, as shown in FIG. 3C, the light amount setting unit 13 calculates a luminance 324 when the light amount (output) of each of the light emitting elements 101 is set to 70(%), instead of calculating a luminance 321 when the light amount (output) of each of the light emitting elements 101 is set to 40(%), a luminance 322 when the light amount (output) of each of the light emitting elements 101 is set to 50(%), and a luminance 323 when the light amount (output) of each of the light emitting elements 101 is set to 60(%). Then, the light amount setting unit 13 calculates the percentage of the light receiving elements having the luminance 324 that has exceeded the luminance threshold value 300. Because the luminance 324 shown in FIG. 3C does not exceed the luminance threshold value 300, the percentage of the light receiving elements having the luminance that has exceeded the luminance threshold value is 0(%). As a result, the percentage is determined to be not within the predetermined range.

Next, the light amount setting unit 13 calculates a luminance 325 when the light amount (output) of each of the light emitting elements 101 is set to 80(%). Because the percentage of the number L4 of the light receiving elements having the luminance 325 that has exceeded the luminance threshold value 300 with respect to the total number L1 of the light receiving elements arranged in the main scanning direction, is within the predetermined range (50(%) to 70(%)), the light amount setting unit 13 determines that the percentage of the light receiving elements having the luminance that has exceeded the luminance threshold value is within the predetermined range.

In this manner, in the example shown in FIG. 3C where the line period is set to 200 (μs), because the light amount setting unit 13 does not calculate the luminance when the light amount (output) of each of the light emitting elements 101 is set to 40(%), 50(%) and 60(%), the light amount can be calculated quickly.

Referring again to FIG. 2, when the light amount setting unit 13 determines that the light amount is determined for all the line periods among the line periods of 400 (μs), 300 (μs), and 200 (μs) that can be set (Step S115: YES), the reference light amount stored in the storing unit 14 is reset to the default value of 40(%) (Step S121).

Figure 4A:
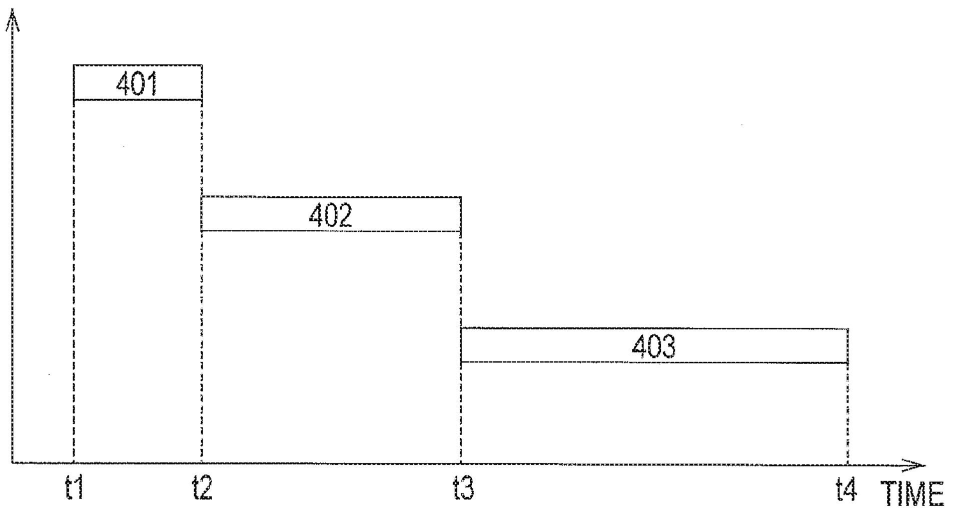
FIG. 4A is a view showing a time taken for determining a light amount of a light emitting element in the conventional technology.
Figure 4B:
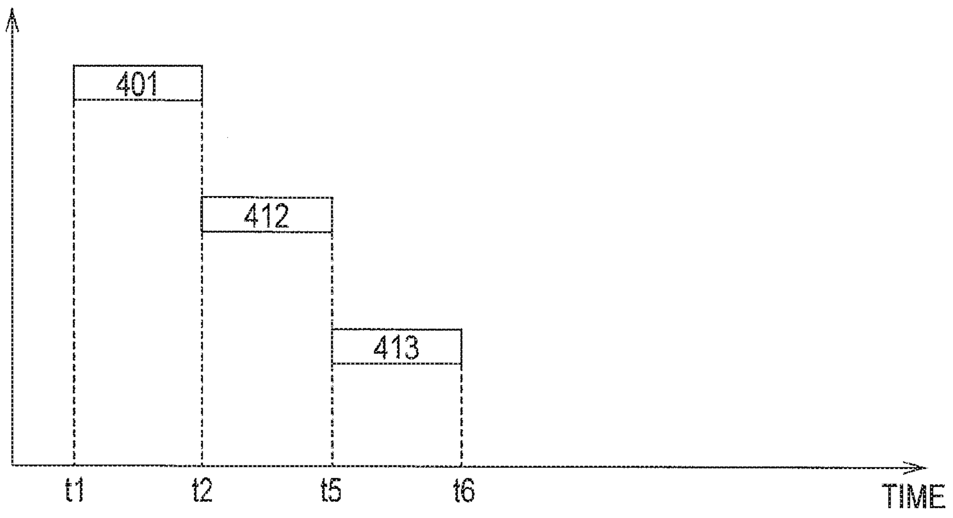
FIG. 4B is a view showing a time taken for determining a light amount of a light emitting element in the image reading apparatus according to the embodiment of the present invention.

FIGS. 4A and 4B show the advantageous effects of the image reading apparatus 1 according to the embodiment of the present invention. FIG. 4A is a view showing a time taken for determining the light amount of the light emitting element in the conventional technology for the purpose of comparison. FIG. 4B is a view showing a time taken for determining the light amount of the light emitting element in the image reading apparatus 1.

As shown in FIG. 4A, in the conventional technology, when the power supply is switched on at a time point t1, by setting the reference light amount to 40(%) at first and changing the light amount in the line period of 400 (μs), 60(%) is determined to be the appropriate light amount.

When the light amount of the light emitting element 101 in the line period of 400 (μs) is determined at a time point t2, from the time point t2 onwards, by setting the reference light amount to 40(%) and changing the amount in the line period of 300 (μs), 70(%) is determined to be the appropriate light amount. Therefore, because it is necessary to calculate the luminance each time when the reference light amount is set to 40(%), 50(%), 60(%), and 70(%), and determine whether the percentage of the light receiving elements having the luminance that has exceeded the luminance threshold value is within the predetermined range, determining the light amount of the light emitting element 101 for the line period of 300 (μs) takes time up to a time point t3.

From the time point t3 onwards, by setting the reference light amount to 40(%) and changing the light amount in the line period of 200 (μs), 80(%) is determined to be the appropriate light amount. Therefore, because it is necessary to calculate the luminance each time when the reference light amount is set to 40(%), 50(%), 60(%), 70(%), and 80(%), and determine whether the percentage of the light receiving elements having the luminance that has exceeded the luminance threshold value is within the predetermined range, determining the light amount of the light emitting element 101 for the line period of 200 (μs) takes time up to a time point t4.

On the other hand, as shown in FIG. 4B, in the image reading apparatus 1, when the power supply is switched on at a time point t1, by setting the reference light amount to 40(%) at first and changing the light amount in the line period of 400 (μs), 60(%) is determined be the appropriate light amount. Therefore, similar to the conventional technology, determining the light amount of the light emitting element 101 for the line period of 400 (μs) takes time up to a time point t2.

However, when 60(%) is determined as the light amount for the light emitting elements 101 in one line period, compared to the conventional technology, a part of the subsequent calculation process can be omitted. As a result, the light amount for the light emitting elements 101 for all the line periods can be determined in a short time.

Specifically, as shown in FIG. 4B, upon determining, the light amount of the light emitting element 101 in the line period of 400 (μs) at the time point t2, from the time point t2 onwards, by setting the reference light amount to 60(%) and changing the light amount in the line period of 300 (μs), 70(%) is determined to be the appropriate light amount. Therefore, because it is not necessary to calculate the luminance each time when the reference light amount is set to 40(%) and 50(%), and determine whether the percentage of the light receiving elements having the luminance that has exceeded the luminance threshold value is within the predetermined range, the light amount of the light emitting element 101 in the line period of 300 (μs) can be determined at a time point t5, which is earlier than the time point t3 shown in FIG. 4A.

From the time point t5 onwards, by setting the reference light amount to 70(%) and changing the light amount in the line period of 200 (μs), 80(%) is determined to be the appropriate light amount. Therefore, because it is not necessary to calculate the luminance each time when the reference light amount is set to 40(%), 50(%), and 60(%), and determine whether the percentage of the light receiving elements having the luminance that has exceeded the luminance threshold value is within the predetermined range, the light amount of the light emitting element 101 in the line period of 200 (μs) can be determined at a time point t6, which is earlier than the time point t4 shown in FIG. 4A.

As described above, according to the image reading apparatus 1, the light amount setting unit 13 causes the light emitting elements 101 to emit the light with gradually changing the reference light amount from the default value of the reference light amount stored in the storing unit 14 in each line period that is sequentially selected by the line period setting unit 11. The light amount setting unit 13 identifies the reference light amount so that the luminance calculated by the luminance calculating unit 12 is within the predetermined range, and causes the storing unit 14 to store the identified reference light amount as the default value of the reference light amount in the next line period. Therefore, when the light amount of the light emitting element 101 is set in a given line period, the luminance can be calculated by considering the set light amount as the reference light amount and it can be determined whether the percentage of the light receiving elements having the luminance that has exceeded the luminance threshold value is within the predetermined range in the other line periods. Thus, compared to the conventional technology, a part of the calculation process can be omitted and the appropriate light amount in each line period can be determined quickly.

In the flowchart shown in FIG. 2, at Step S103, the predefined longest line period of 400 (μs) is set as the default value among the line periods of 400 (μs), 300 (μs), and 200 (μs) that can be set as the line period. Therefore, the appropriate light amount is determined by sequentially shortening the line period at Step S117, and increasing the light amount in each line period at Step S111.

Therefore, in the example mentioned above, the light amount of the light emitting element 101 in the line period of 400 (μs) is determined, and then the light amount of the light emitting element 101 in the line period of 300 (μs) and the light amount of the light emitting element 101 in the line period of 200 (μs) are determined sequentially.

As described above, when the line period is long, an image can be appropriately read even with a small light amount, but when the line period is short, a large light amount required to appropriate read the image.

Therefore, because the appropriate light amount is determined while gradually shortening the line period when the longest line period is set the default value, the light amount must always be larger than the light amount determined in the previous line period. In such a case, when the predefined longest line period of 400 (μs) is set as the default value of the line period, the appropriate light amount is determined by sequentially shortening the line period at Step S117, and increasing the light amount in each line period at Step S111.

However, in the image reading apparatus according to the embodiment of the present invention, the shortest line period can be set as the default value of the line period.

In this case, in the flowchart shown in FIG. 2, a predefined shortest line period of 200 (μs) is set as the default value among the line periods of 400 (μs), 300 (μs), and 200 (μs) that can be set as the line period at Step S103. Therefore, the appropriate light amount can be determined by sequentially making longer the line period at Step S117, and decreasing the light amount in each line period at Step S111.

What is claimed is:

1. An image reading apparatus including a platen upon which a document to be read is supportable and a white reference density board, the image reading apparatus comprising:

a light emitter that emits light;

a light receiver that receives the light reflected by the white density reference board upon being emitted from the light emitter; and a controller, the controller comprising:

a line period setter that sequentially sets a line period, from among a plurality of line periods having mutually different intervals of a light receiving start signal sent from the light receiver, each line period being associated with a line reading interval for reading a document supported on the platen line by line;

a luminance calculator that calculates a luminance based on a light amount received by the light receiver in the line period set by the line period setter;

a storage that stores a plurality of reference light amounts, each reference light amount is a reference light amount of the light emitted by the light emitter; and a light amount setter that, in each line period, causes the light emitter to emit the light with a gradual change in the reference light amount from a reference light amount set as a default value, of the plurality of reference light amounts stored in the storage, identifies a reference light amount so that the luminance calculated by the luminance calculator is within a predetermined range, associated with obtaining sufficient luminance for reading one line, sets the identified reference light amount as a default value for the next line period, and causes the storage to store the identified reference light amount.

2. The image reading apparatus according to claim 1, a plurality of light receivers is arranged in a line in a main scanning direction, the luminance calculator calculates a luminance based on a light amount received by each of the light receivers, and the light amount setter identifies a reference light amount so that a percentage of the light receivers that have a luminance in excess of a luminance threshold is within the predetermined range.

* * * * *